(12) United States Patent
Hilmi et al.

(10) Patent No.: US 8,435,694 B2
(45) Date of Patent: May 7, 2013

(54) MOLTEN CARBONATE FUEL CELL CATHODE WITH MIXED OXIDE COATING

(75) Inventors: Abdelkader Hilmi, Danbury, CT (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 2301 days.

(21) Appl. No.: 10/755,483

(22) Filed: Jan. 12, 2004

(65) Prior Publication Data

US 2005/0153186 A1    Jul. 14, 2005

(51) Int. Cl.
    *B05D 5/12*       (2006.01)
    *H01M 8/14*     (2006.01)

(52) U.S. Cl.
    USPC .......................... 429/473; 429/478; 427/115

(58) Field of Classification Search .................. None
See application file for complete search history.

(56) References Cited

U.S. PATENT DOCUMENTS

| | | |
|---|---|---|
| 3,505,120 A | 4/1970 | Cole |
| 4,104,133 A | 8/1978 | Brannan et al. |
| 4,297,419 A * | 10/1981 | Nickols et al. .................. 429/44 |
| 4,342,792 A | 8/1982 | Brown et al. |
| 4,466,868 A | 8/1984 | Gray |
| 4,702,971 A | 10/1987 | Isenberg |
| 4,752,369 A | 6/1988 | Caldwell et al. |
| 4,812,329 A | 3/1989 | Isenberg |
| 5,399,438 A | 3/1995 | Tateishi et al. |
| 5,670,270 A | 9/1997 | Wallin |
| 5,874,374 A | 2/1999 | Ong |
| 5,908,713 A | 6/1999 | Ruka et al. |
| 6,117,580 A | 9/2000 | Nitschke et al. |
| 6,296,972 B1 | 10/2001 | Hong et al. |
| 6,358,567 B2 | 3/2002 | Pham et al. |
| 6,458,170 B1 | 10/2002 | Visco et al. |
| 2002/0127455 A1 | 9/2002 | Pham et al. |
| 2002/0127456 A1* | 9/2002 | Pham et al. ..................... 429/33 |
| 2002/0155335 A1 | 10/2002 | Kearl |
| 2002/0164522 A1 | 11/2002 | Huang et al. |
| 2003/0082426 A1 | 5/2003 | Hong et al. |
| 2003/0096155 A1 | 5/2003 | Hong et al. |

FOREIGN PATENT DOCUMENTS

| | | |
|---|---|---|
| DE | 4224290 | 1/1994 |
| DE | 4235514 | 4/1994 |
| DE | 4241266 | 7/1994 |
| DE | 19523635 | 7/1996 |
| DE | 19620504 | 11/1997 |

(Continued)

OTHER PUBLICATIONS

Official English translation of JP 2002-352808.*

(Continued)

*Primary Examiner* — Ula C Ruddock
*Assistant Examiner* — Matthew Van Oudenaren
(74) *Attorney, Agent, or Firm* — Cowan, Liebowitz & Latman, P.C.

(57) ABSTRACT

A molten carbonate fuel cell cathode having a cathode body and a coating of a mixed oxygen ion conductor materials. The mixed oxygen ion conductor materials are formed from ceria or doped ceria, such as gadolinium doped ceria or yttrium doped ceria. The coating is deposited on the cathode body using a sol-gel process, which utilizes as precursors organometallic compounds, organic and inorganic salts, hydroxides or alkoxides and which uses as the solvent water, organic solvent or a mixture of same.

4 Claims, 4 Drawing Sheets

FOREIGN PATENT DOCUMENTS

| | | |
|---|---|---|
| DE | 19812513 | 9/1999 |
| GB | 1121273 | 7/1968 |
| JP | 61071559 | 4/1986 |
| JP | 8020846 | 1/1996 |
| JP | 2002-352808 * | 6/2002 |
| JP | 2002352808 A * | 12/2002 |
| WO | WO 98/49738 | 11/1998 |
| WO | WO 99/16140 | 4/1999 |
| WO | WO 02/07966 | 1/2002 |
| WO | WO 02/073729 | 9/2002 |
| WO | WO 03/035255 | 5/2003 |
| WO | WO 03/036739 | 5/2003 |

OTHER PUBLICATIONS

Daza et al. ("Modified nickel oxides as cathode materials for MCFC," 2000, Journal of Power Sources, vol. 86, pp. 329-333).*

Balazs et al. ("ac impedance studies of rare earth oxide doped ceria," 1995, Solid State Ionics, vol. 76, pp. 155-162).*

J. Soler, T. Gonzalez, M.J. Escudero, T. Rodrigo, L. Daza, Endurance test on a single cell of a novel cathode material for MCFC, Journal of Power Sources 106, pp. 189-195 (2002).

Jonghee Han, Seung-Goo Kim, Sung Pil Yoon, Suk Woo Nam, Tae-Hoon Lim, In-Hwan Oh, Seong-Ahn Hong, Hee Chun Lim, Performance of LiCoO2-coated NiO cathode under pressurized conditions, Journal of Power Sources 106, pp. 153-159 (2002).

Anders Lundblad, Stephan Schwartz, Bill Bergman, Effect of sintering procedures in development of LiCoO2-cathodes for the molten carbonate fuel cell, Journal of Power Sources 90, pp. 224-230 (2000).

L. Daza, C.M. Rangel, J. Baranda, M.T. Casais, M.J. Martinez, J.A. Alonso, Modified nickel oxides as cathode materials for MCFC, Journal of Power Sources 86, pp. 329-333 (2000).

Seong-Ahn Hong, Suk Woo Nam, In-Hwan Oh, Tae Hoon Lim, Heung Yong Ha, Keon Kim and Hee Chun Lim, Fabrication and performance of LiCoO2-coated NiO cathode for molten carbonate fuel cell, Fuel Cell Seminar, pp. 142-145 (1998).

S.T. Kuk, H.J. Kwon, H.S. Chun, K. Kim, Properties of LiCoO2-coated NiO MCFC cathode, Fuel Cell Seminar, pp. 367-370 (1996).

Ken-ichiro Ota, Yasuhiro Takeishi, Soichi Shibata, Hideaki Yoshitake, Nobuyuki Kamiya, Nobuyuki Yamazaki, Solubility of Cobalt Oxide in Molten Carbonate, J. Electrochem. Soc., vol. 142, No. 10, pp. 3322-3326 (Oct. 1995).

L. Plomp, E.F. Sitters, C. Vessies, F.C. Eckes, Polarization Characteristics of Novel Molten Carbonate Fuel Cell Cathodes, J. Electrochem. Soc., vol. 138, No. 2, pp. 629-630 (Feb. 1991).

M.L Orlield, D.A. Shores, The Solubility of NiO in Binary Mixtures of Molten Carbonates, J. Electrochem. Soc., vol. 136, No. 10, pp. 2862-2866 (Oct. 1989).

Joel D. Doyon, Thomas Gilbert, Geoffrey Davies, Lawrence Paetsch, NiO Solubility in Mixed Alkali/Alkaline Earth Carbonates, J. Electrochem. Soc., vol. 134, No. 12, pp. 3035-3038 (Dec. 1987).

W. Lada, et al., Synthesis of LiCoO2 and LiMg0.05Co0.95O2 thin films on porous Ni/NiO cathodes for MCFC by Complex Sol-Gel Process (CSGP), Journal of New Materials for Electrochemical Systems 6, p. 33-37 (2003).

W. Lada, et al., Preparation and Characterization of LiCoO2 and LiMg0.05Co0.95O2 thin films on porous Ni/NiO cathodes for MCFC by complex sol-gel, CAPLUS, Materials Research Society (Apr. 24, 2000).

US Patent, Foreign Patent Documents and Non-Patent Literature Documents cited above were cited in a Supplementary Search Report issued in the counterpart EPO application on Jul. 22, 2009. A Supplementary Search Report is submitted herewith.

European Office Action issued on Mar. 14, 2012, which is enclosed, that issued in the corresponding European Patent Application No. 04812583.5. The cited references were previously submitted to the USPTO on Dec. 28, 2010 and considered by Examiner on Jan. 18, 2011.

* cited by examiner

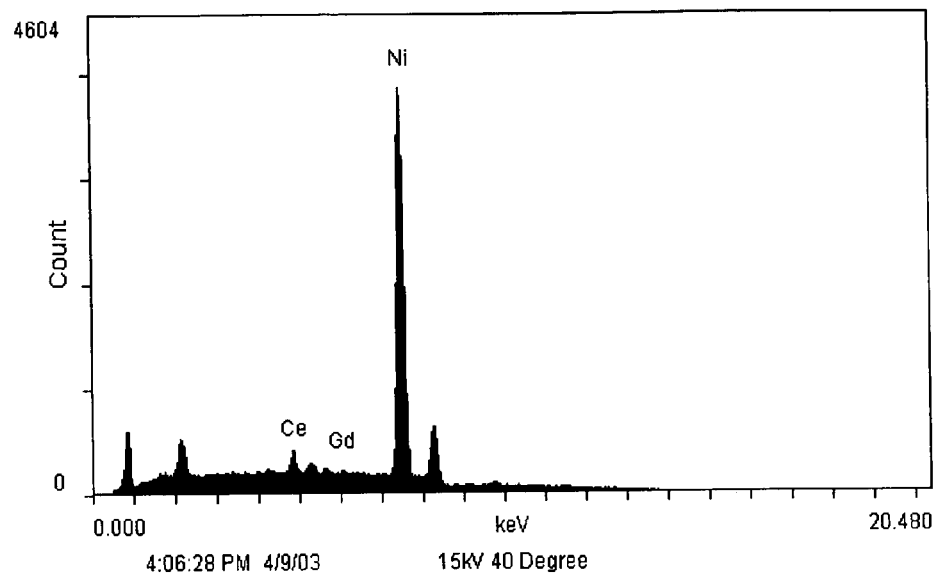
FIG. 3C
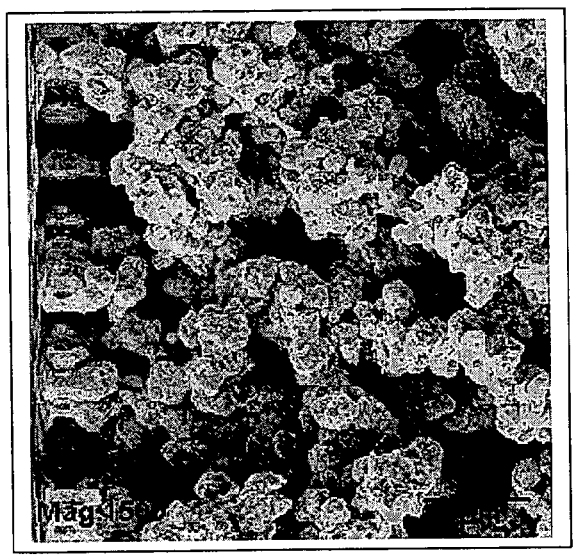
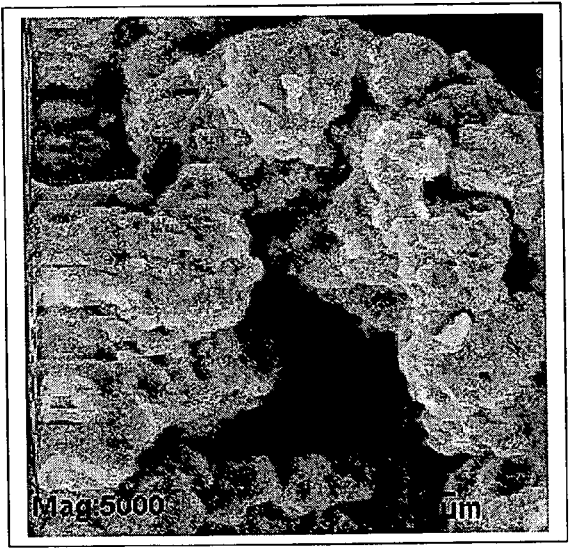
FIG. 3A  FIG. 3B

MOLTEN CARBONATE FUEL CELL CATHODE WITH MIXED OXIDE COATING

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to molten carbonate fuel cells, and, in particular to molten carbonate fuel cell cathodes.

A fuel cell is a device which directly converts chemical energy stored in hydrocarbon fuel into electrical energy by means of an electrochemical reaction. A fuel cell generally comprises an anode and a cathode separated by an electrolyte, which serves to conduct electrically charged ions. Molten carbonate fuel cells operate by passing a reactant fuel gas through the anode, while passing oxidizing gas through the cathode. In order to produce a useful power level, a number of individual fuel cells are stacked in series with an electrically conductive separator plate between each cell.

Molten carbonate fuel cell performance and operating life are dependent in part on the characteristics of the anode and the cathode employed in the fuel cell. For example, fuel cell cathodes need to have excellent conductivity and must have high mechanical strength and durability.

The most commonly used molten carbonate fuel cell cathodes are formed from nickel oxide (NiO) material. Nickel oxide is often preferred to other materials because of its high conductivity at the fuel cell operating conditions. However, the lifetime of nickel oxide cathodes in molten carbonate fuel cells is limited by the dissolution and subsequent precipitation of nickel in the fuel cell electrolyte. More specifically, the presence of carbon dioxide in the cathode gas promotes cathode dissolution, resulting in the following reaction in the cathode:

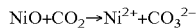

$$NiO + CO_2 \rightarrow Ni^{2+} + CO_3^{2-}$$

As can be appreciated, the nickel ($Ni^{2+}$) obtained from the above reaction accumulates and precipitates in the electrolyte matrix. The presence of nickel in the electrolyte matrix creates short circuits, thereby causing a rapid decay in the fuel cell's performance.

Moreover, the properties and performance of molten carbonate fuel cell cathodes are negatively affected by cathode dissolution. In particular, the durability of the cathode decreases considerably as the cathode dissolves. Additionally, NiO dissolution increases the NiO particles of the cathode, therefore significantly reducing the active surface area of the cathode.

Accordingly, it has been recognized that the durability and performance of a molten carbonate fuel cell can be enhanced by reducing the dissolution of its cathode. More particularly, it has been proposed to employ an electrolyte having a more basic pH, such as by increasing the concentration of Li in the $Li_2CO_3/Na_2CO_3$ electrolyte or by adding oxides, e.g. SrO, MgO or $La_2O_3$, to the electrolyte, in order to reduce the negative effects of cathode dissolution. In addition, alternative materials for use in fuel cell cathodes, such as $LiCoO_2$, $LiFeO_2$ and $Li_2MnO_3$, have been developed which have lower dissolution rates in molten electrolyte.

These methods, however, have not been entirely effective in improving the performance of molten carbonate fuel cells. The addition of oxides such as SrO, MgO or $La_2O_3$ to the electrolyte decreases the ionic conductivity of the electrolyte resulting in decreased performance. Also, increasing Li concentration in the electrolyte also increases the melting point of the electrolyte negatively affecting fuel cell performance at low temperatures. Moreover, alternative cathode materials are inadequate for use as molten carbonate fuel cell cathodes due to their low conductivity properties or an insignificant decrease in cathode solubility in the electrolyte matrix at high carbon dioxide pressures.

Mixed oxygen ion conductors, such as ceria and doped ceria compounds, have been used in electrode coatings and fuel cell layers in solid oxide fuel cell applications. For example, U.S. Pat. Nos. 4,702,971 and 4,812,329 disclose a nickel anode for a solid oxide fuel cell having an ionic-electronic conductor coating comprising doped or undoped ceria. In addition, U.S. patent application Publication No. US 2003/0082436 describes an electrode coated with ion conductive ceramic ceria film. More particularly, this application discloses a coated anode for use in a solid oxide fuel cell prepared by dip coating the anode with ceria or doped ceria sol to form an oxygen ion conductive ceramic film.

Moreover, ceria and doped ceria have been used to coat molten carbonate fuel cell anodes. For example, U.S. patent application Publication No. US 2003/0096155 discloses an anode made of an Ni-based alloy or a metal compound for use in a molten carbonate fuel cell coated by a porous ceramic film formed using a sol-gel process. The films described include aluminum oxide sol, cerium oxide sol, cerium hydroxide sol and other compounds.

As can be appreciated from the above, molten carbonate fuel cell cathodes are still needed which exhibit improved properties and, in particular, a higher resistance to NiO dissolution.

It is therefore an object of the present invention to provide a molten carbonate fuel cell cathode which has improved performance characteristics.

It is also an object of the present invention to provide a molten carbonate fuel cell cathode which exhibits reduced dissolution.

It is yet a further object of the present invention to provide a molten carbonate fuel cell cathode having reduced polarization.

SUMMARY OF THE INVENTION

The above and other objects are realized in a molten carbonate fuel cell cathode comprising a cathode body and a coating on the cathode body comprised of mixed oxygen ion conductor materials. Preferably, the mixed oxygen ion conductor materials include ceria or doped ceria, such as gadolinium doped ceria ("GDC") or yttrium doped ceria ("YDC"). Also disclosed is a method for forming the cathode using a sol-gel process.

BRIEF DESCRIPTION OF THE DRAWINGS

The above and other features and aspects of the present invention will become more apparent upon reading the following detailed description in conjunction with the accompanying drawings, in which:

FIGS. 3A and 3B show cross sectional SEM micrographs at different magnifications of a molten carbonate fuel cell cathode sample having a GDC coating;

FIG. 3C shows an EDS analysis of a molten carbonate fuel cell cathode sample having a GDC coating;

DETAILED DESCRIPTION

In accordance with the principles of the present invention, a molten carbonate fuel cell cathode of a molten carbonate fuel cell is coated with a thin film of mixed oxygen ion conductors to reduce cathode dissolution and improve cathode polarization. In further accord with the invention, ceria ($CeO_2$), yttrium-doped ceria ($Ce_{1-x}Y_xO_2$) ("YDC") and Gadolinium-doped ceria ($Ce_{1-x}Gd_xO_2$) ("GDC") are the preferred coating materials, where x is between 0.1 and 0.4, and preferably equal to 0.1 or 0.2. These materials are preferred because of their high ionic conductivity at the operating temperature (650° Celsius) of the fuel cell and their low solubility in molten carbonate electrolyte, as compared with the conductivity and solubility of conventional coating materials such as $LiCoO_2$. In addition, mixed oxygen ion conductors such as ceria and doped ceria have good wettability properties and are able to retain the electrolyte. Accordingly, the mixed oxygen ion conductor coating on the cathode surface decreases the contact angle between the cathode and the electrolyte, reducing the surface tension, and improves the electrolyte distribution in the molten carbonate fuel cell.

Figure 1:
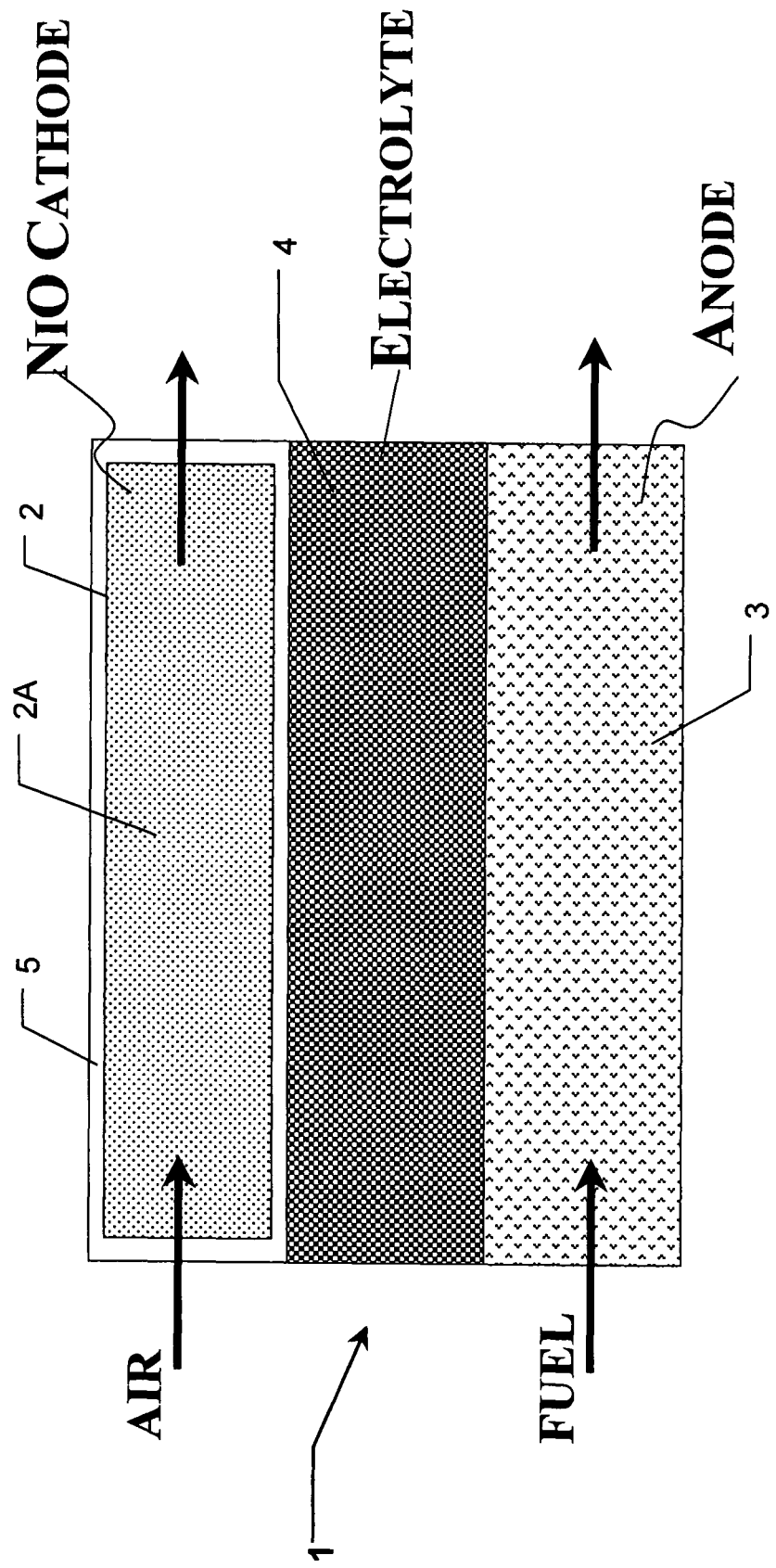
FIG. 1 schematically illustrates a molten carbonate fuel cell including a molten carbonate fuel cell cathode having a coating in accordance with the principles of the present invention.

FIG. 1 schematically shows a molten carbonate fuel cell employing a coated molten carbonate fuel cell cathode in accordance with the present invention. As shown, the fuel cell 1 comprises a cathode 2 and an anode 3. Between the cathode and anode is an electrolyte matrix 4 including an alkali carbonate electrolyte. Also, as shown in FIG. 1, the cathode body 2A is coated with a film 5 comprising mixed oxygen ion conductors in accordance with the invention.

In further accord with the invention, the mixed oxygen ion conductors are preferably coated on the fuel cell cathode body using a thin film sol-gel coating process. The sol-gel coating process involves the dissolution of precursors containing the required metal ions in a suitable solvent to form a sol-gel having an appropriate viscosity and pH. Organic salts, inorganic salts, hydroxides, nitrate salts, acetate salts and alkoxides may be used as precursors in the preparation of the sol-gels. The solvent used in the preparation of the sol-gel may be water, an organic solvent or a mixture of water and an organic solvent.

The sol-gel is coated on the molten carbonate fuel cell cathode body by using dipping or spraying techniques. After coating, the cathode body is dried in air at temperatures between 94° and 150° Celsius, followed by calcination or recrystallization in air at a temperature above 350° Celsius. Because the sol-gel adheres well to the surface of the molten carbonate fuel cell cathode body, the cathode body does not need to be pre-treated before depositing the sol-gel on its surface. Several examples for the preparation of sol-gels for depositing mixed oxygen ion conductors on molten carbonate fuel cell cathodes are described below.

Example 1

In this example, preparation of an aqueous based GDC sol-gel as well as the preparation and testing of GDC-coated cathode samples are described. The main precursors for the sol-gel comprise gadolinium acetate and cerium acetate. Other precursors such as gadolinium hydroxide, cerium hydroxide, gadolinium nitrate, cerium nitrate and others can also be used.

The preparation of the GDC sol-gel is accomplished in three steps. In the first step, a gadolinium acetate precursor is dissolved in water, followed by the addition of a cerium acetate precursor to the solution. This aqueous mixture is stirred until both of the precursors are completely dissolved. In the second step, a complexing agent, such as citric acid, is added slowly to the aqueous precursor mixture, while stirring the mixture energetically. Upon the addition of citric acid to the aqueous mixture, a milky white solution is formed instantaneously. This solution is then stirred for 4 hours while being heated at 70° to 80° Celsius. In the third step, ammonium hydroxide is added to the solution to adjust the pH to about 9. The resulting sol-gel remains stable and homogeneous for several months.

A similar process may be used for preparing sols with different cerium doping levels. For example, GDC sol-gels comprising $Ce_{1-x}Gd_xO_2$ having different cerium doping levels can be prepared where x is equal to 0.1 or 0.2.

$Ce_{0.9}Gd_{0.1}O_2$ acetate sol-gel is prepared by dissolving 33.4 grams of gadolinium acetate in 2 liters of water and then adding 285.5 grams of cerium acetate. This solution is stirred and heated to 70-80° Celsius until all of the components are dissolved. After stirring the solution for 2 hours, 200 grams of citric acid is added to the solution, while stirring energetically. A milky white solution which forms upon the addition of citric acid is stirred for 4 hours at 70-80° Celsius. The pH of the resulting solution is adjusted to about 9 by adding concentrated ammonium hydroxide, and the volume of the solution is reduced to 1600-1400 milliliters by heating it overnight (14 to 16 hours) at 70-80° Celsius. Where a sol-gel having a higher viscosity is desired, the volume of the solution may be reduced to less than 1200 milliliters. Additionally, the viscosity of the solution may be increased by using a solvent comprising 80% water and 20% ethylene glycol instead of water as the initial solvent.

$Ce_{0.8}Gd_{0.2}O_2$ sol-gel having a different cerium doping level may be prepared using a similar method as discussed above for $Ce_{0.9}Gd_{0.1}O_2$ acetate. However, different concentrations of the precursors, i.e., cerium acetate and gadolinium acetate, are used in the preparation of $Ce_{0.8}Gd_{0.2}O_2$ sol-gel. More specifically, the amount of cerium acetate precursor is 253.8 grams, and the amount of gadolinium acetate precursor is 66.8 grams.

Coated molten carbonate fuel cell cathodes are fabricated using the prepared GDC sol-gel. Samples of sintered molten carbonate fuel cell cathode bodies made from nickel and having a surface area of 3.3 $cm^2$ (for button cells) or 250 $cm^2$ (for single cells) are used without further pre-treatment. A dip-coating method is used to coat the cathode samples with sol-gel. A conventional dip coater is employed at 25° Celsius and an appropriate pressure. Dip coating is performed by dipping the cathode samples into the sol-gel for a period of 1-4 minutes, with a preferred dipping period being 2 minutes. During the dip-coating process, vacuum or sonication can be applied to the fuel cell cathode sample in order to remove the air trapped in the pores of the cathode.

After undergoing the dipping process, cathode samples are dried in air at 94° to 100° Celsius for overnight (i.e, 14 to 16 hours), followed by calcination at 450° Celsius for a period of 45 to 60 minutes.

The amount and thickness of the coating deposited on the surface of the cathode depends mainly on the viscosity of the sol-gel used for coating the cathode. The amount of coating deposited on the cathode using the above process may be between 2 and 4 weight percent of the MCFC cathode. Also, the thickness of the resulting film coating on the surface and inside the pores of the cathode sample should be below 1 μm. In this case, a low viscosity of the sol gel is preferred in order to coat the pores in the cathode and to prevent any significant changes in the porosity of the cathode. It is preferred that the change in the cathode porosity after the dip coating process should not exceed 3 percent.

Figure 2:
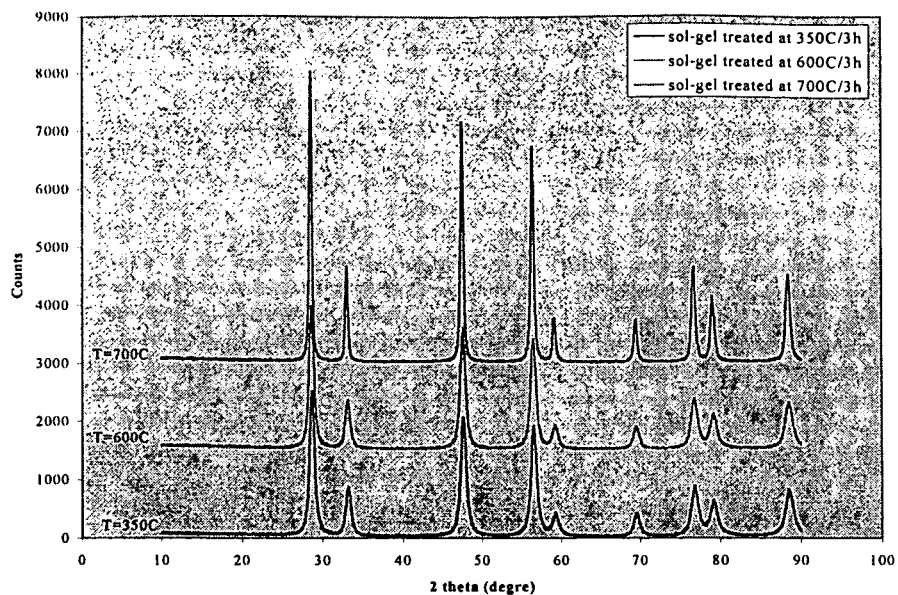
FIG. 2 shows an X-ray diffraction spectrum of a GDC sol-gel treated at different temperatures.

FIG. 2 shows an X-ray diffraction spectrum for GDC sol-gel coating material calcinated at different temperatures from 350 to 700° Celsius. As can be seen in FIG. 2, the GDC phase started to form at a relatively low temperature of 350° Celsius, with no additional phases or peaks being observed.

FIGS. 3A and 3B show SEM images at 1500× and 5000× magnifications, respectively, of a GDC-coated cathode sample of this example calcinated at 650° Celsius for 2 hours. FIG. 3C shows an Energy Dispersive Spectroscopy (EDS) analysis of the GDC-coated cathode sample shown in the SEM images. The EDS analysis was used to verify the uniformity of the coating on the cathode surface. The atomic and weight percent of the elements present in the cathode sample after the calcination process are summarized as follows:

| Elements | Atom % | Weight % |
|---|---|---|
| Ce | 1.8 | 4.17 |
| Gd | 0.27 | 0.69 |
| Ni | 97.94 | 95.14 |

As shown in FIGS. 3A, 3B and 3C, the GDC coating material is uniformly distributed on the nickel particles of the cathode and is strongly bonded to the surface of the cathode. More particularly, the EDS analysis in FIG. 3C indicates the presence of cerium and gadolinium in the cathode sample and confirms that these elements are strongly bonded to the cathode after the calcination process. Moreover, the ratio of Ce/Gd is relatively uniform in different parts of the coated cathode sample. The actual ratio of Ce/Gd in the cathode sample, however, is slightly lower than the theoretical ratio of approximately 9 due to some loss of material during the drying and calcination processes.

GDC-coated cathode samples prepared according to this example, were tested in single cells and in button cells also comprising a Ni—Al anode and LiAlO$_2$ electrolyte matrix filled with electrolyte comprising 62% Li$_2$CO$_3$ and 38% K$_2$CO$_3$. Anode gas used during these tests comprised 72% hydrogen, 18.2% carbon dioxide and 9% water. Cathode gas comprised 18.5% carbon dioxide, 12.1% oxygen, 66.4% nitrogen and 3% water. These tests were performed at a current density of 160 mA/cm$^2$ with 75% utilization rate in the anode and the cathode.

In single cell tests, GDC-coated electrolyte filled cathodes having a large surface area of 250 cm$^2$ were employed. In button cell tests, samples of GDC-coated cathodes having a small surface area of about 3 cm$^2$ were used.

Figure 4:
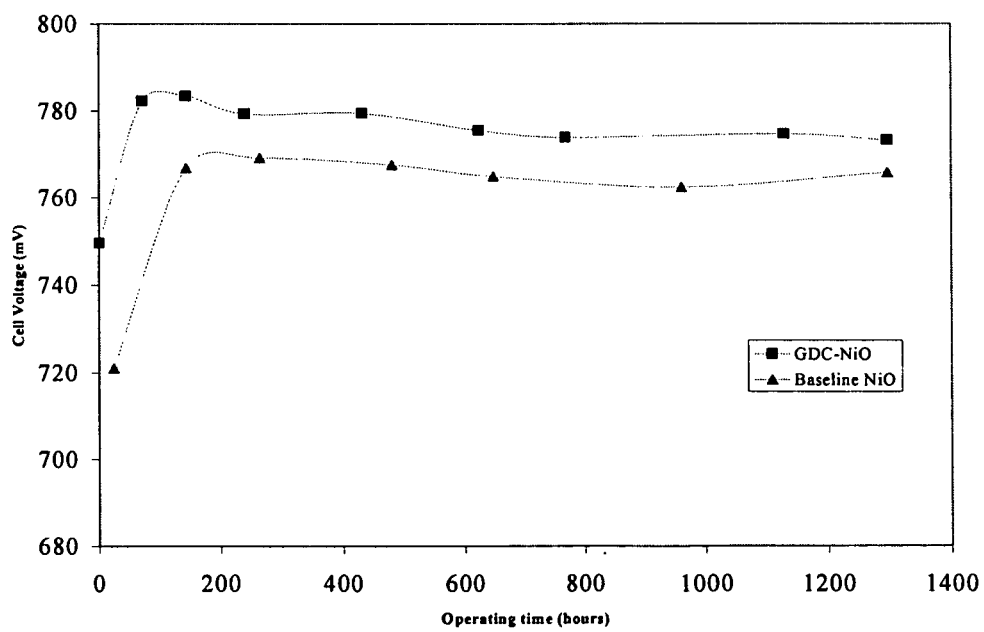
FIG. 4 shows the cell voltage of an uncoated molten carbonate fuel cell cathode and molten carbonate fuel cell cathodes coated with a GDC coating.

FIG. 4 shows a graph of performance data for a single cell employing a GDC-coated cathode as compared to the performance data for a single cell employing a conventional uncoated NiO cathode. Performance data was measured at a current density of 160 mA/cm$^2$, 75% fuel utilization and 75% oxidant utulization. The X-axis in FIG. 4 represents the operating time of the single cell in hours, while the Y-axis represents the cell voltage in mV. The performance of the single cell being tested is directly proportional to the cell voltage obtained in the cell.

As shown in FIG. 4, single cells using GDC-coated cathodes prepared in accordance with the present example produced a 10 to 15 mV higher voltage than single cells employing conventional uncoated cathodes. More particularly, at the commencement of the cell operation, the cell voltage was low in both cells due to the incomplete lithiation of the cathode and cathode flooding. However, even during this stage, the cell voltage in single cells using GDC-coated cathodes was higher than the cell voltage in single cells using conventional uncoated cathodes. After about 140 hours of operation, the performance of the cells became stable, during which time the cell voltage in the single cell using a GDC-coated cathode remained higher than the voltage of the single cell using a conventional cathode.

In button cell tests, a similar improvement in performance was obtained. The tests in button cells using GDC-coated cathodes also showed an improvement in the cathode polarization. Particularly, the polarization of GDC-coated cathodes was recorded to be about 10 mV lower than the polarization of conventional uncoated cathodes.

In addition, GDC-coated cathode samples prepared in accordance with the present example were tested to determine the extent of cathode dissolution over an operation period of 1400 hours. GDC-coated cathode samples having a large surface area of 250 cm$^2$ were tested in single cells at 160 mA/cm$^2$ current density and at 75% utilization rate. At the conclusion of the 1400-hour period of single cell operation, the electrolyte matrix of each cell was analyzed for nickel deposition and compared with the matrix of a cell using a conventional uncoated cathode.

Figure 5:
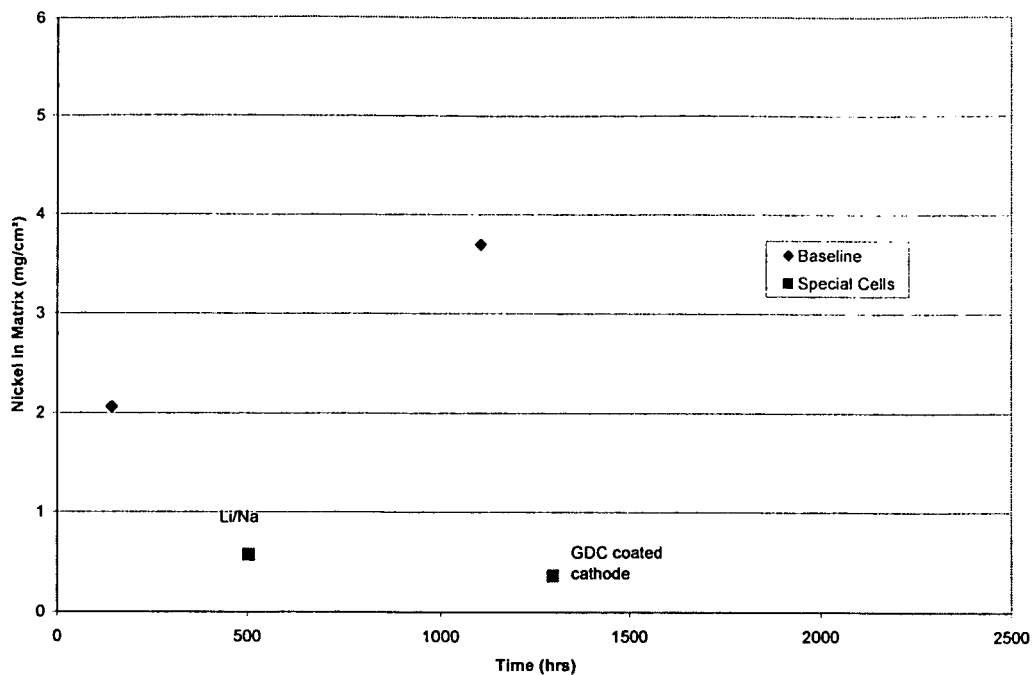
FIG. 5 shows the amount of nickel deposition over time in single cells employing uncoated molten carbonate fuel cell cathodes and a molten carbonate fuel cell cathode coated with a GDC coating.

FIG. 5 shows a graph of nickel deposition data in the electrolyte matrix over a period of time for single cells employing GDC-coated cathodes and conventional baseline cathodes. As shown in FIG. 5, the X-axis represents the time in hours, and the Y-axis represents the amount of nickel deposited in the electrolyte matrix in mg/cm$^2$. As can be seen in FIG. 5, there was only a minimum deposition of nickel in the electrolyte matrix when GDC-coated cathodes were used in single cells as compared to the amount of nickel deposition in the electrolyte of single cells using conventional baseline cathodes, thus confirming that GDC coating decreases the dissolution rate of NiO cathodes.

Example 2

In this example, the preparation of GDC sol-gel using gadolinium nitrate and cerium nitrate as precursors is described. In this case, a process similar to the one described in Example 1 is employed, except the addition of citric acid or ammonium hydroxide is not required.

The preparation of GDC sol-gel in this example is accomplished in two steps. In the first step, 34.3 grams of gadolinium nitrate is dissolved in a solvent comprising 1800 milliliters of water and 200 milliliters of ethylene glycol, and 293.5 grams of cerium nitrate is then added to the mixture. This mixture is stirred until both of the precursors are completely dissolved in the solvent. In the second step, the solution from the first step is heated overnight at the temperature of 70-80° Celsius until the total volume of the solution is reduced to 1200 milliliters. The sol-gel formed remains stable for several months.

Example 3

In this example, the preparation of water-based sol-gel for depositing $Ce_{0.8}Y_{0.2}O_2$ ("YDC") on a nickel cathode is described. In this case, a process similar to the one described in Example 1 is employed. Yttrium acetate and cerium acetate are used as the main precursors in the preparation of the YDC sol-gel. Other precursors such as yttrium nitrate, yttrium hydroxide, cerium nitrate and cerium hydroxide can also be used.

In the first step of YDC sol-gel preparation, yttrium acetate is dissolved in deionized water. An appropriate ratio of cerium acetate is then added to the yttrium acetate solution while stirring the solution energetically until these precursors are completely dissolved. In the second step, citric acid is added to the precursor solution to form a milky white-yellow solution. The solution is then heated at 70° Celsius and stirred for 4 hours. In the final step, ammonium hydroxide is added to the solution to adjust the pH to 9. This solution is then heated for 2 to 4 hours at 70° Celsius to form a dark green sol-gel. The resulting sol-gel has an estimated stability of several months.

Molten carbonate fuel cell cathode samples are coated with the YDC sol-gel using a dip coating process described in Example 1. Samples of coated cathodes prepared in accordance with this example were tested in button cells, which employ 3 $cm^2$ coated cathode samples and in single cells which employ 250 $cm^2$ coated cathode samples. As can be appreciated, the presence of YDC on the surface of the cathode reduces cathode polarization by 10 to 12 mV as compared to polarization of uncoated cathodes. More particularly, the presence of YDC on the surface of the cathode facilitates the transport of the intermediate reaction product ($O^{2-}$) away from the reaction site, thereby reducing concentration polarization. Accordingly, the polarization in YDC-coating cathodes is lower than in conventional uncoated cathodes.

Figure 6:
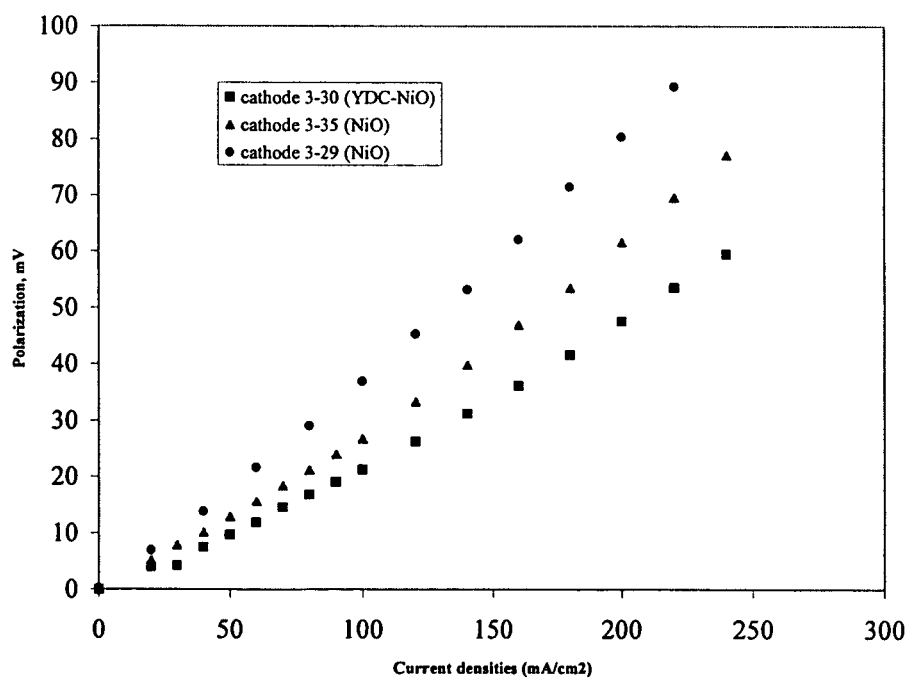
FIG. 6 shows the polarization versus current density of uncoated molten carbonate fuel cell cathodes and a molten carbonate fuel cell cathode coated with a YDC coating.

The positive effect of the YDC coating on cathode polarization can be seen in FIG. 6 which illustrates the polarization of YDC-coated cathodes at different current densities compared with the polarization of conventional uncoated cathodes (3-35 and 3-29). As shown, the polarization of the molten carbonate fuel cell cathodes coated with YDC according to this example is lower than the polarization of uncoated cathodes. In addition, as the current density increases, the difference in the polarization of the coated cathodes and the uncoated cathodes increases.

Tests using YDC-coated cathodes in single cells also showed an improvement in performance by about 10 mV. These tests also confirmed the low polarization results obtained in button cells.

Example 4

In this example, the preparation of ceria ($CeO_2$) sol-gel for depositing on a nickel molten carbonate fuel cell cathode body is described. In this case, a process similar to the one described in Examples 1 and 2 is employed, and cerium acetate is used as the main precursor.

In the first step of $CeO_2$ sol-gel preparation, cerium acetate is dissolved in deionized water. Citric acid is then added slowly to the precursor solution while stirring energetically to form a milky white-yellow solution in the second step of the preparation. The solution is then heated at 70° to 80° Celsius and stirred for 4 hours. In the final step, ammonium hydroxide is added to the solution to adjust the pH to 9, forming a dark green sol-gel solution. The resulting sol-gel has an estimated stability of several months.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:
1. A molten carbonate fuel cell comprising:
an anode;
a cathode;
an electrolyte situated between said cathode and anode;
wherein said cathode comprises a porous cathode body having an outer surface; and a coating on the cathode body comprised of $Ce_{0.8}Y_{0.2}O_2$, said coating being disposed over the entire outer surface of said cathode body and in the pores in said cathode body, the amount of said coating being between 2 and 4 weight % of the cathode, and said coating having a thickness of less than about 1 μm; and
wherein the coating on the cathode body protects the cathode body from dissolution by molten carbonate electrolyte.

2. A molten carbonate fuel cell cathode in accordance with claim 1, wherein said cathode body comprises one of nickel and NiO.

3. A molten carbonate fuel cell comprising:
an anode;
a cathode;
an electrolyte situated between said cathode and anode;
wherein said cathode comprises a porous cathode body having an outer surface; and a coating on the cathode body comprised of yttrium doped ceria ($Ce_{1-x}Y_xO_2$ where x is between 0.1 and 0.4), said yttrium doped ceria comprising $Ce_{0.8}Y_{0.2}O_2$, said coating being disposed over the entire outer surface of said cathode body and in the pores in said cathode body, and said coating having a thickness of less than about 1 μm; and
wherein the coating on the cathode body protects the cathode body from dissolution by molten carbonate electrolyte.

4. A molten carbonate fuel cell cathode in accordance with claim 3, wherein said cathode body comprises one of nickel and NiO.

* * * * *